US012604151B2

(12) United States Patent
Kim et al.

(10) Patent No.: US 12,604,151 B2
(45) Date of Patent: Apr. 14, 2026

(54) COMPUTER SYSTEM FOR PROCESSING AUDIO CONTENT AND METHOD THEREOF

(71) Applicants: NAVER CORPORATION, Seongnam-si (KR); GAUDIO LAB, INC., Seoul (KR)

(72) Inventors: Jung Sik Kim, Seongnam-si (KR); Dae Hwang Kim, Seongnam-si (KR); Dong Hwan Kim, Seongnam-si (KR); Taegyu Lee, Seoul (KR); Jeonghun Seo, Seoul (KR); Hyeonsu Seo, Seoul (KR)

(73) Assignees: NAVER CORPORATION, Seongnam-si (KR); GAUDIO LAB, INC., Seoul (KR)

( * ) Notice: Subject to any disclaimer, the term of this patent is extended or adjusted under 35 U.S.C. 154(b) by 183 days.

(21) Appl. No.: 17/809,337

(22) Filed: Jun. 28, 2022

(65) Prior Publication Data

US 2022/0417693 A1      Dec. 29, 2022

(30) Foreign Application Priority Data

Jun. 28, 2021      (KR) ........................ 10-2021-0083681

(51) Int. Cl.
*H04S 7/00*          (2006.01)
*G06F 16/683*      (2019.01)
*H04S 3/00*          (2006.01)

(52) U.S. Cl.
CPC ............ *H04S 7/301* (2013.01); *G06F 16/683* (2019.01); *H04S 3/002* (2013.01); *H04S 3/008* (2013.01); *H04S 2420/01* (2013.01)

(58) Field of Classification Search
CPC .......... H04S 7/301; H04S 3/002; H04S 3/008; H04S 2420/01; G06F 16/683
See application file for complete search history.

(56) References Cited

U.S. PATENT DOCUMENTS

| | | | | |
|---|---|---|---|---|
| 2015/0332680 | A1* | 11/2015 | Crockett ................. | G10L 19/20 381/23 |
| 2016/0064003 | A1* | 3/2016 | Mehta ..................... | G10L 19/20 381/23 |

(Continued)

FOREIGN PATENT DOCUMENTS

| | | |
|---|---|---|
| JP | 2006503490 A | 1/2006 |
| JP | 2015531078 A | 10/2015 |

OTHER PUBLICATIONS

Gaudio, "Spatial Audio—The Spatial Audio SDK from the first leading spatial audio company", Mar. 11, 2021, www.gaudiolab.com, pp. 1-3. (Year: 2021).*

(Continued)

*Primary Examiner* — Daniel R Sellers
(74) *Attorney, Agent, or Firm* — Greer Burns & Crain Ltd.

(57)              ABSTRACT
A computer system for processing audio content may receive content that includes metadata on spatial features about a plurality of objects, convert a format set according to a production environment of the content to a format according to a playback environment in an electronic apparatus, and transmit the content in the converted format to the electronic apparatus. The computer system may support content produced in various production environments and various playback environments.

18 Claims, 13 Drawing Sheets

(56)                    References Cited

U.S. PATENT DOCUMENTS

| 2016/0104496 | A1* | 4/2016 | Purnhagen | ............ | G10L 19/008 |
| | | | | | 381/23 |
| 2016/0157039 | A1* | 6/2016 | Disch | .................... | G10L 19/032 |
| | | | | | 381/23 |
| 2016/0295343 | A1* | 10/2016 | Tsingos | ................... | H04S 7/308 |
| 2017/0032801 | A1* | 2/2017 | Baumgarte | .......... | G11B 27/322 |
| 2017/0195819 | A1* | 7/2017 | Harder | .................... | H04S 3/008 |
| 2021/0409888 | A1* | 12/2021 | Schevciw | ............... | H04R 5/04 |

OTHER PUBLICATIONS

Office Action issued in corresponding Japanese patent application No. 2022-103609, dated Aug. 1, 2023.

* cited by examiner

<u>100</u>

| start chunk | BtrsController | | | Spaitalizer (n) | | | | | | | | end chunk |
| --- | --- | --- | --- | --- | --- | --- | --- | --- | --- | --- | --- | --- |
| | version | scene rendererType | num spatializer | target scene | group | rendering type | x | y | z | bes | gain | |
| 4Byte | 2Byte | 1Byte | 1Byte | 1Byte | 1Byte | 1Byte | 2Byte | 2Byte | 2Byte | 1Byte | 2Byte | 4Byte |

FIG. 7

| |
|---|
| Channel 1 |
| Channel 2 |
| Channel 3 |
| Channel 4 |
| Channel 5 |
| Channel 6 |
| Channel 7 |
| Channel 8 |
| Channel 9 |
| Channel 10 |
| Channel 11 |
| Channel 12 |
| Channel 13 |
| Channel 14 |
| Channel 15 |
| Ch. 16 (Meta. Track) |

FIG. 8

| SCE1 | SCE2 | SCE3 | SCE4 | SCE5 | SCE6 | ⋯ | SCE15 | DSE |

| Channel 1 (FL) |
|:---:|
| Channel 2 (FR) |
| Channel 3 (FC) |
| Channel 4 (LFE) |
| Channel 5 (SL) |
| Channel 6 (SR) |

| Channel 1 (FL) |
|---|
| Channel 2 (FR) |
| Channel 3 (FC) |
| Channel 4 (LFE) |
| Channel 5 (SL) |
| Channel 6 (SR) |
| Channel 7 (SBL) |
| Channel 8 (SBR) |

COMPUTER SYSTEM FOR PROCESSING AUDIO CONTENT AND METHOD THEREOF

CROSS-REFERENCE TO RELATED APPLICATION(S)

This U.S. non-provisional application claims the benefit of priority under 35 U.S.C. § 119 to Korean Patent Application No. 10-2021-0083681 filed on Jun. 28, 2021, in the Korean Intellectual Property Office (KIPO), the entire contents of which are incorporated herein by reference.

BACKGROUND OF THE INVENTION

Field of Invention

One or more example embodiments of the present invention in the following description relate to a computer system for processing audio content and a method thereof.

Description of Related Art

In general, a content providing server provides audio content in a completed form for a user. Here, the audio content in the completed form, that is, the completed audio content is implemented by mixing a plurality of audio signals, and, for example, represents stereo audio content. Through this, an electronic apparatus of a user receives the completed audio content and simply plays back the received audio content. That is, the user only listens to the sound of a predetermined configuration based on the completed audio content.

BRIEF SUMMARY OF THE INVENTION

One or more example embodiments provide a computer system for supporting content produced in various production environments and various playback environments and a method thereof.

One or more example embodiments provide a computer system that may realize a user-customized immersive experience for the user in various playback environments with respect to content produced in various production environments.

According to an aspect of at least one example embodiment, there is provided a method by a computer system for providing audio content, including receiving content that includes metadata on spatial features about a plurality of objects; converting a format of the content according to a playback environment of the content in an electronic apparatus; and transmitting the content in the converted format to the electronic apparatus.

According to an aspect of at least one example embodiment, there is provided a non-transitory computer-readable recording medium storing instructions that, when executed by a processor, cause the processor to perform the method for providing audio content.

According to an aspect of at least one example embodiment, there is provided a computer system including a memory; a communication module; and a processor configured to connect to each of the memory and the communication module and to execute at least one instruction stored in the memory. The processor is configured to receive content that includes metadata on spatial features about a plurality of objects through the communication module, to convert a format of the content according to a playback environment of the content in an electronic apparatus, and to transmit the content in the converted format to the electronic apparatus through the communication module.

According to some example embodiments, a computer system may support content produced in various production environments and various playback environments. That is, the computer system may provide the content to the electronic apparatus in a format that matches a corresponding playback environment. To this end, the computer system may convert a format of content set according to a production environment to match the playback environment. Therefore, the computer system may realize a user-customized immersive experience for the user in various playback environments with respect to content produced in various production environments. Here, the computer system may process immersive content as well as plain content.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

Figure 8:
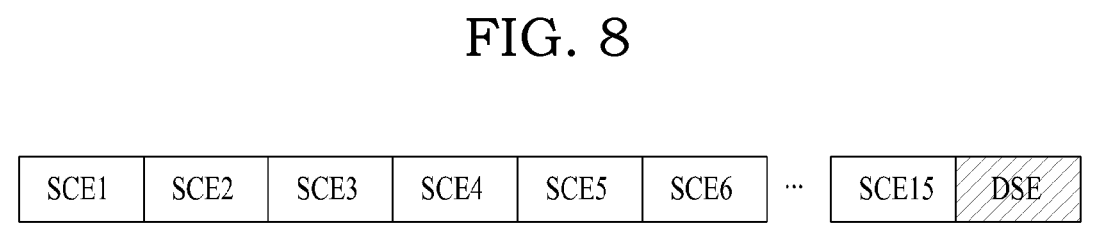

FIGS. 6, 7, 8, 9A, 9B, 10A, and 10B are diagrams illustrating examples of describing a function of a server according to at least one example embodiment;

Figure 1:
FIG. 1 is a block diagram illustrating an example of a content providing system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

In the following, the term "object" may represent a device or a person that generates an audio signal. For example, the object may include one of a musical instrument, an instrument player, a vocalist, a talker, a speaker that generates accompaniment or sound effect, and a background that generates ambience. The term "audio file" may represent audio data for an audio signal generated from each object.

In the following, the term "metadata" may represent information for describing a property of an audio scene related to at least one audio file. Here, the audio scene may include at least one object and the metadata may include at least one spatial feature of the object. For example, the metadata may include at least one of position information about at least one object, group information representing a position combination of at least two objects, and environment information about a venue in which at least one object is disposed. The venue may include, for example, a studio, a concert hall, a street, and a stadium.

FIG. 1 is a diagram illustrating an example of a content providing system 100 according to at least one example embodiment.

Referring to FIG. 1, the content providing system 100 may include a computer system 110 and an electronic apparatus 150.

The computer system 110 may provide content for a user. Here, the content may refer to various types of contents, such as, for example, audio content, video content, virtual reality (VR) content, augmented reality (AR) content, and extended reality (XR) content. The content may include at least one of plain content and immersive content. The plain content may refer to completed content and the immersive content may refer to user-customized content. Hereinafter, description is made using the audio content as an example.

Plain audio content may be implemented in a stereo form by mixing audio signals generated from a plurality of objects. Immersive audio content may include audio files for the audio signals generated from the plurality of objects and metadata related thereto. Here, in the immersive audio content, the audio files and the metadata related thereto may be individually present.

The electronic apparatus 150 may play back content provided from the computer system 110. Here, the content may refer to various types of contents, such as, for example, audio content, video content, VR content, AR content, and XR content. The content may include at least one of plain content and immersive content.

When the immersive audio content is received from the computer system 110, the electronic apparatus 150 may obtain the audio files and the metadata related thereto from the immersive audio content. The electronic apparatus 150 may render the audio files based on the metadata. In other words, the electronic apparatus 150 may play the audio files together based on the metadata. Through this, the electronic apparatus 150 may realize, i.e., create, a user-customized immersive user experience in association with audio based on the immersive audio content. Therefore, the user may feel as if the user is there at the venue in which the audio signal is generated.

Figure 2:
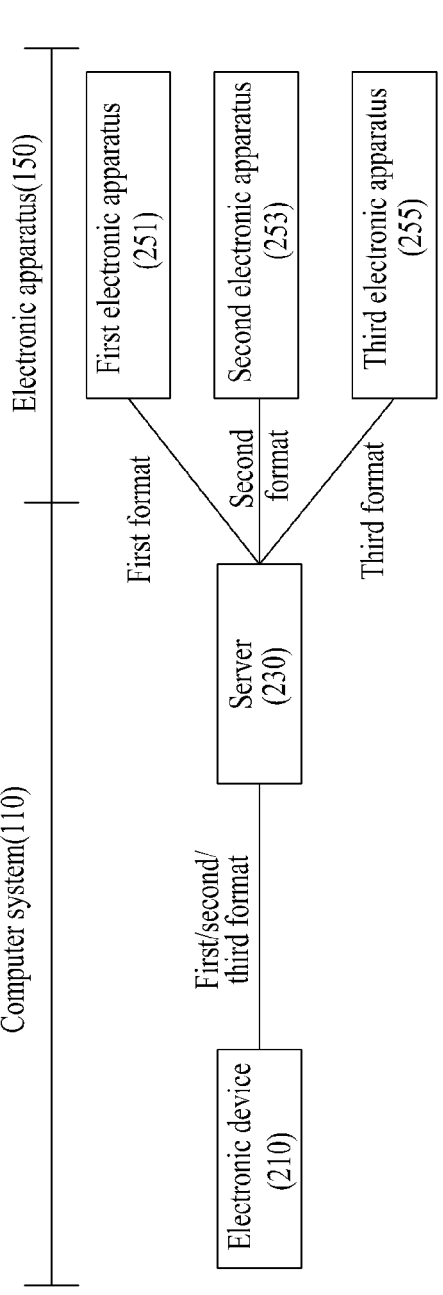
FIG. 2 is a block diagram illustrating an example of a configuration of a computer system and an electronic apparatus of FIG. 1.
Figure 3:
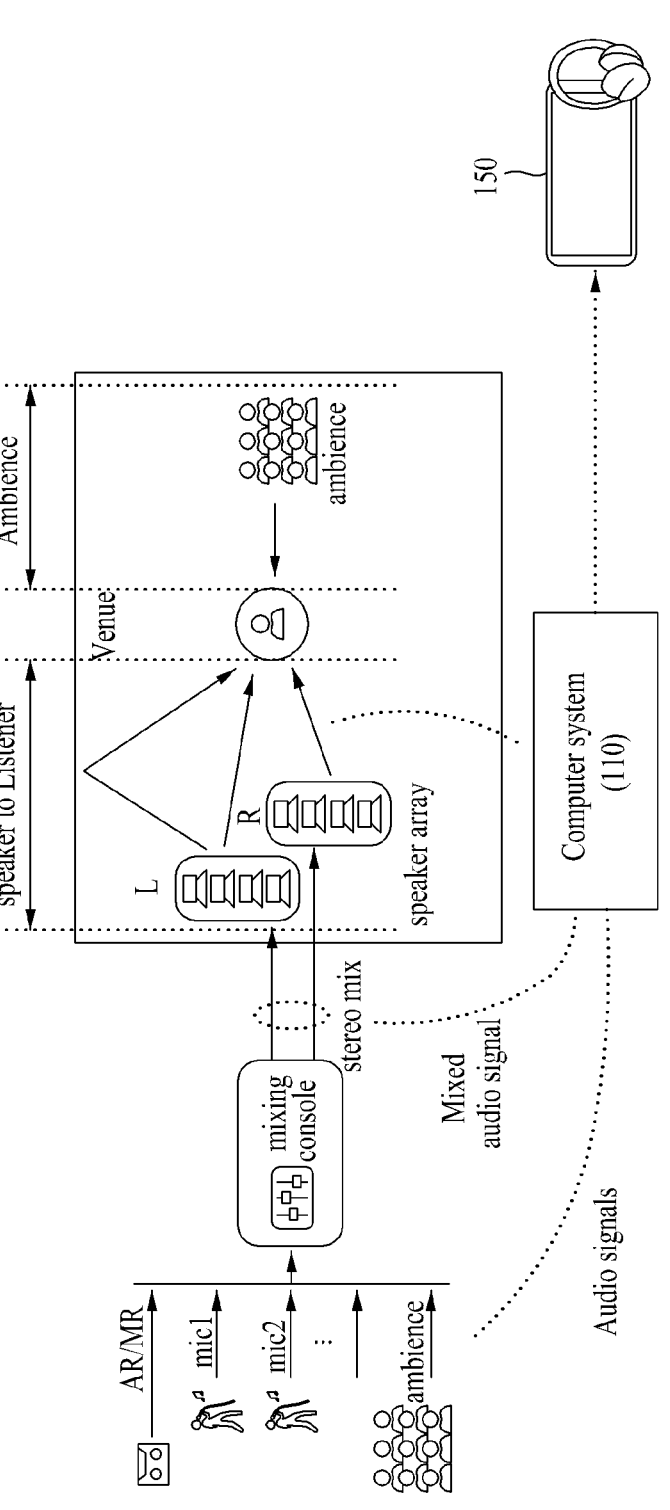
FIG. 3 illustrates an example of a function of the computer system of FIG. 1.

FIG. 2 is a diagram illustrating an example of a detailed configuration of the computer system 110 and the electronic apparatus 150 of FIG. 1. FIG. 3 illustrates an example of a function of the computer system 110 of FIG. 1.

Referring to FIGS. 2 and 3, the computer system 110 may include at least one of an electronic device (also, referrable to as a production studio) 210 and a server 230. In some example embodiments, at least one of components of the computer system 110 may be omitted and at least one another component may be added. In some example embodiments, at least two components among the components of the computer system 110 may be integrated into a single component. According to an example embodiment, the electronic device 210 and the server 230 may be integrated into a single component. For example, the electronic device 210 may refer to a device equipped with various hardware, for example an audio console and an audio interface such as Dante, and may include at least one of a smartphone, a mobile phone, a navigation device, a computer, a laptop computer, a digital broadcasting terminal, a personal digital assistant (PDA), a portable multimedia (PMP), a tablet PC, a game console, a wearable device, an Internet of Things (loT) device, a home appliance, a medical device, and a robot.

The electronic device 210 may produce content. Here, a production environment of the content may be defined according to the type of the electronic device 210. A format of the content may be set according to the production environment of the content. That is, the electronic device 210 may produce the content in a preset format. The format of the content may include at least one of a first format or a second format for immersive content and a third format for plain content. The first format may represent a format for rendering and playing back audio signals related to objects based on metadata. For example, the first format may include a GA7 format and the GA7 format may be represented in a binary format. The second format may represent a format for playing back the audio signals related to the objects through a plurality of audio output devices based on the metadata and may also be referred to as a multichannel format. For example, the second format may include an audio definition model (ADM) format and the ADM format may be represented in an extensible markup language (XML) format. Here, the ADM format is supported by object-oriented audio technologies, such as 5.1, 7.1, and Dolby Atmos. That is, audio content in the first format may include metadata according to the first format and audio content in the second format may include metadata according to the second format.

In some example embodiments, referring to FIG. 2, the electronic device 210 may produce content in at least one of the first format, the second format, and the third format. In the following, description is made based on an example of using audio content.

Audio content in the third format, that is, plain audio content may be implemented in a stereo format in which audio signals generated from a plurality of objects are mixed. For example, the electronic device 210 may acquire an audio signal in which audio signals are mixed at a venue and may generate plain audio content based on the audio signal. Also, audio content in the first format, that is, immersive audio content may include audio files for the audio signals generated from the plurality of objects at the venue and metadata related thereto. Here, in the immersive audio content, the audio files and the metadata related thereto may be individually present. For example, the electronic device 210 may acquire each of the audio files for the plurality of objects and based thereon, may generate the immersive audio content.

According to at least one example embodiment, a playback environment of the electronic apparatus 150 may be defined. Here, the playback environment of the electronic apparatus 150 may be determined according to the type of the electronic apparatus 150. The electronic apparatus 150 may play back the content according to its own playback environment.

In detail, the electronic apparatus 150 may include at least one of a first electronic apparatus 251 or a second electronic apparatus 253 capable of playing back the immersive content and a third electronic apparatus 255 capable of playing back the plain content. The first electronic apparatus 251 relates to playing back content in the first format and may render and play back audio signals related to objects based on metadata. For example, the first electronic apparatus 251 may include at least one of a smartphone, a mobile phone, a navigation device, a computer, a laptop computer, a digital broadcasting terminal, a PDA, a PMP, a tablet PC, a game console, a wearable device, an IoT device, a home application, a medical device, and a robot. The second electronic apparatus 253 relates to playing back the content in the second format and may play back the audio signals related to the objects through a plurality of audio output devices based on the metadata. For example, the second electronic apparatus 253 may include at least one of an audio video receiver (AVR), a soundbar, and a home cinema. The third electronic apparatus 255 refers to playing back the content in the third format and may play back the received plain content.

The server 230 may transmit the content to the electronic apparatus 150. Here, the server 230 may transmit the content according to a playback environment of the content. In detail, the server 230 may process the content depending on whether the production environment and the playback environment of the content match.

According to an example embodiment, when the production environment and the playback environment of the content do not match, the server 230 may convert the type of the content. Here, the server 230 may convert the type of the content to match the playback environment of the content in the electronic apparatus 150. For example, to play back the content in the second format in the first electronic apparatus 251, the server 230 may convert the content in the second format received from the electronic device 210 to the content in the first format. Through this, the server 230 may transmit the content in the first format to the first electronic apparatus 251. As another example, to play back the content in the first format in the second electronic apparatus 253, the server 230 may convert the content in the first format received from the electronic device 210 to the content in the second format. Through this, the server 230 may transmit the content in the second format to the second electronic apparatus 253.

According to another example embodiment, when the production environment and the playback environment of the content match, the server 230 may maintain the format of the content without changing the same. For example, to play back the content in the first format in the first electronic apparatus 251, the server 230 may deliver the content in the first format received from the electronic device 210 to the first electronic apparatus 251. As another example, to play back the content in the second format in the second electronic apparatus 253, the server 230 may deliver the content in the second format received from the electronic device 210 to the second electronic apparatus 253. As another example, to play back the content in the third format in the third electronic apparatus 255, the server 230 may deliver the content in the third format received from the electronic device 210 to the third electronic apparatus 255.

Figure 4:
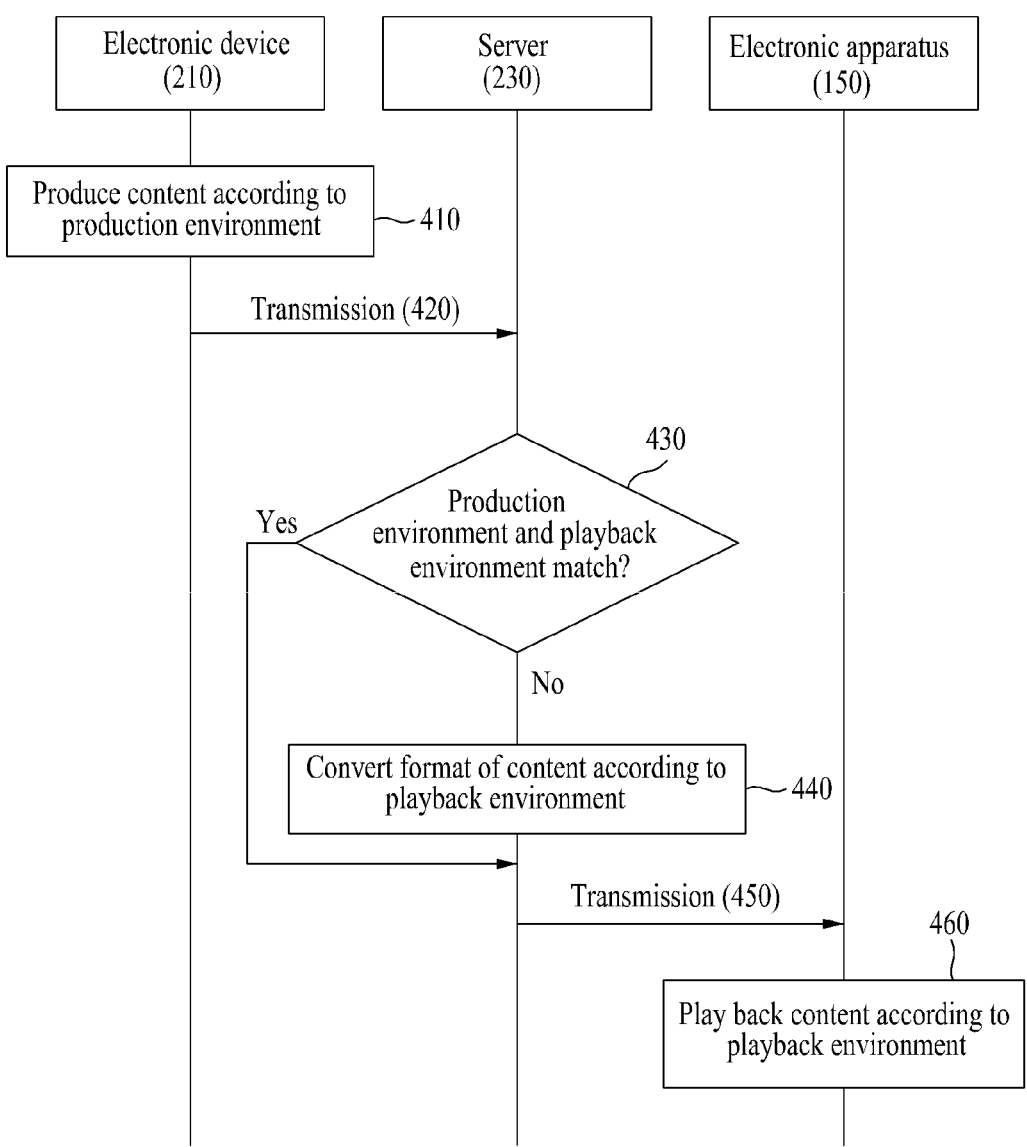
FIG. 4 is a flowchart illustrating an example of a signal flow in a content providing system according to at least one example embodiment.

FIG. 4 illustrates an example of a signal flow in the content providing system 100 according to at least one example embodiment.

Referring to FIG. 4, in operation 410, the electronic device 210 may produce content according to a production environment. Here, the production environment of the content may be defined according to the type of the electronic device 210. A format of the content may be set according to the production environment of the content. The format of the content may be set to one of a first format, a second format, and a third format. The content in the first format may include metadata according to the first format as immersive content. The content in the second format may include metadata according to the second format as immersive content. The content in the third format may be plain content. The electronic device 210 may produce content in at least one of the first format, the second format, and the third format. In operation 420, the electronic device 210 may transmit the content to the server 230. Through this, in operation 420, the server 230 may receive the content from the electronic device 210.

In operation 430, the server 230 may determine whether the production environment and a playback environment of the received content match. That is, the server 230 may determine whether the production environment matches the playback environment for the content. Here, the server 230 may determine whether the production environment matches the playback environment based on the format of the content since the format of the content is set according to the production environment.

When it is determined that the production environment and the playback environment of the content do not match in operation 430, the server 230 may convert the format of the content according to the playback environment in operation 440. That is, the server 230 may convert the type of the content to match the playback environment of the content in the electronic apparatus 150. In operation 450, the server 230 may transmit the content in the converted format to the electronic apparatus 150. For example, to play back the content in the second format in the first electronic apparatus 251, the server 230 may convert the content in the second format received from the electronic device 210 to the content in the first format. Through this, the server 230 may transmit the content in the first format to the first electronic apparatus 251. As another example, to play back the content in the first format in the second electronic apparatus 253, the server 230 may convert the content in the first format received from the electronic device 210 to the content in the second format. Through this, the server 230 may transmit the content in the second format to the second electronic apparatus 253.

When it is determined that the production environment and the playback environment of the content match in operation 430, the server 230 may transmit the content in the set format to the electronic apparatus 150 in operation 450. That is, the server 230 may transmit the content to the electronic apparatus 150 while maintaining the format of the content without converting the same. For example, to play back the content in the first format in the first electronic apparatus 251, the server 230 may deliver the content in the first format received from the electronic device 210 to the first electronic apparatus 251. As another example, to play back the content in the second format in the second electronic apparatus 253, the server 230 may deliver the content in the second format received from the electronic device 210 to the second electronic apparatus 253. As another example, to play back the content in the third format in the third electronic apparatus 255, the server 230 may deliver the content in the third format received from the electronic device 210 to the third electronic apparatus 255.

In operation 460, the electronic apparatus 150 may play back the received content according to the playback environment. Here, the electronic apparatus 150 may include at least one of the first electronic apparatus 251, the second electronic apparatus 253, and the third electronic apparatus 255. The first electronic apparatus 251 may receive and play back the content in the first format. Here, the first electronic apparatus 251 may render and play back audio signals related to the objects based on metadata. The second electronic apparatus 253 may receive and play back the content in the second format. Here, the second electronic apparatus 253 may play back the audio signals related to the objects through a plurality of audio output devices based on metadata. The third electronic apparatus 255 may receive and play back the content in the third format. Here, the third electronic apparatus 255 may play back the received plain content.

Figure 5:
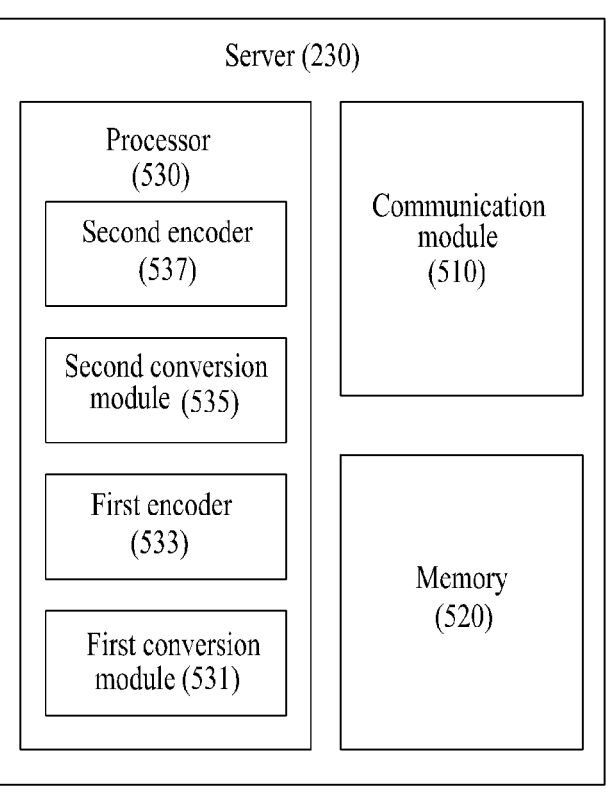
FIG. 5 is a block diagram illustrating an example of an internal configuration of a server according to at least one example embodiment.

FIG. 5 is a diagram illustrating an example of an internal configuration of the server 230 according to at least one example embodiment. FIGS. 6, 7, 8, 9A, 9B, 10A, and 10B illustrate examples of explaining a function of the server 230.

Referring to FIG. 5, the server 230 may include at least one of a communication module 510, a memory 520, and a processor 530. In some example embodiments, at least one of components of the server 230 may be omitted and at least one another component may be added. In some example embodiments, at least two components among components of the server 230 may be implemented as a single integrated circuitry.

The communication module 510 may enable the server 230 to communicate with the external device. The communication module 510 may establish a communication channel between the server 230 and the external device and communicate with the external device through the communication channel. For example, the external device may include at least one of the electronic device 210 and the electronic apparatus 150. The communication module 510 may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN). In some example embodiments, the communication module 510 may support at least one of an HTTP livestreaming (HLS) protocol or a dynamic adaptive streaming over HTTP (DASH).

The memory 520 may store a variety of data used by at least one component of the server 230. For example, the memory 520 may include at least one of a volatile memory and a non-volatile memory. Data may include at least one program and input data or output data related thereto. The program may be stored in the memory 520 as software including at least one instruction.

The processor 530 may control at least one component of the server 230 by executing the program of the memory 520. Through this, the processor 530 may perform data processing or operation. Here, the processor 530 may execute an instruction stored in the memory 520. The processor 530 may transmit the content to the electronic apparatus 150. Here, the processor 530 may transmit the content according to a playback environment of the content. In detail, the processor 530 may process the content depending on whether the production environment and the playback environment of the content match. According to an example embodiment, when the production environment and the playback environment of the content do not match, the processor 530 may convert the type of the content. Here, the processor 530 may convert the type of the content to match the playback environment of the content in the electronic apparatus 150. According to another example embodiment, when the production environment and the playback environment of the content match, the processor 530 may maintain the format of the content without converting the same.

In detail, the format of the content may be set to one of the first format, the second format, and the third format. The content in the first format may refer to immersive content and the first format may represent a format for rendering and playing back audio signals related to objects based on metadata. For example, the first format may include a GA7 format and the GA7 format may be represented in a binary format. The content in the second format may refer to immersive content and the second format may represent a format for playing back the audio signals related to the objects through a plurality of audio output devices based on the metadata and may also be referred to as a multichannel format. For example, the second format may include an ADM format and the ADM format may be represented in an XML format. Here, the ADM format is supported by object-oriented audio technologies, such as 5.1, 7.1, and Dolby Atmos. That is, audio content in the first format may include metadata according to the first format and audio content in the second format may include metadata according to the second format. The content in the third format may be plain content.

According to at least one example embodiment, the processor 530 may include at least one of a first conversion module 531, a first encoder 533, a second conversion module 535, and a second encoder 537.

Figure 6:
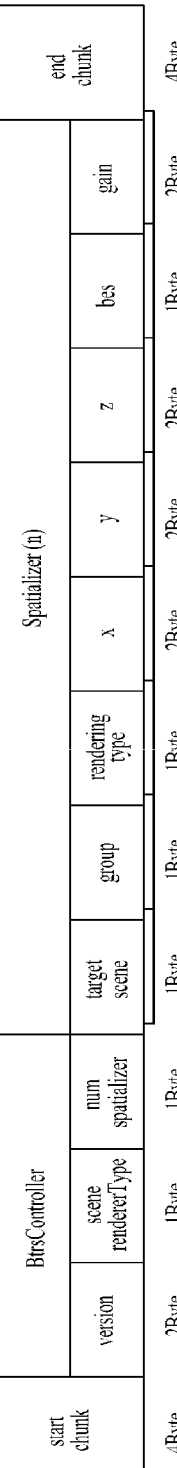

The first conversion module 531 may convert the content in the second format to the content in the first format. Here, the first conversion module 531 may also be referred to as a converter. To play back the content in the second format in the first electronic apparatus 251, the first conversion module 531 may convert the content in the second format received from the electronic device 210 through the communication module 510 to the content in the first format. For example, the first conversion module 531 may convert the content in the ADM format to the content in the GA7 format. According to an example embodiment, the first conversion module 531 may generate the content in the first format by detecting metadata from the content in the second format and by converting the detected metadata to the first format. For example, the first conversion module 531 may convert the detected metadata to metadata that is expressed in a binary format of a structure of FIG. 6 and may generate the content in the first format into a PCM input structure of FIG. 7 using the converted metadata. Referring to FIG. 6, the metadata may represent at least one of a position of each object, an audio effect related to each object, and an audio effect related to a venue. Referring to FIG. 7, the PCM input structure may support an advanced audio coding (AAC) standard and may include a plurality of channels, and one of the channels may be provided for the converted metadata.

The first encoder 533 may encode the content in the first format. For example, the first encoder 533 may encode the content in the GA7 format. According to an example embodiment, the first encoder 533 may encode the content in the first format output from the first conversion module 531. According to another example embodiment, the first encoder 533 may encode the content in the first format received from the electronic device 210 through the communication module 510. For example, the first encoder 533 may also be referred to as an AAC encoder. The first encoder 533 may encode the content in the first format from the PCM input structure of FIG. 7 to an AAC bitstream structure of FIG. 8. Here, the metadata of the content in the first format may be injected to a data stream element (DSE) in the AAC bitstream. Through this, the processor 530 may transmit the content in the first format to the electronic apparatus 150 through the communication module 510. Here, the processor 530 may transmit the content in the first format to the first electronic apparatus 251. Therefore, the first electronic apparatus 251 may play back the content in the first format.

The second conversion module 535 may convert the content in the first format to the content in the second format. Here, the second conversion module 535 may also be referred to as a downmixer. To play back the content in the first format in the second electronic apparatus 253, the second conversion module 535 may convert the content in the first format received from the electronic device 210 through the communication module 510 to the content in the second format. For example, the second conversion module 535 may convert the content in the GA7 format to the content in the multichannel format. According to an example embodiment, the second conversion module 535 may convert the content in the first format to the content in the second format based on a layout for audio output devices of the playback environment. Through this, the processor 530 may transmit the content in the second format to the electronic apparatus 150 through the communication module 510. Here, the processor 530 may transmit the content in the second format to the second electronic apparatus 253.

Figures 9A, 9B:
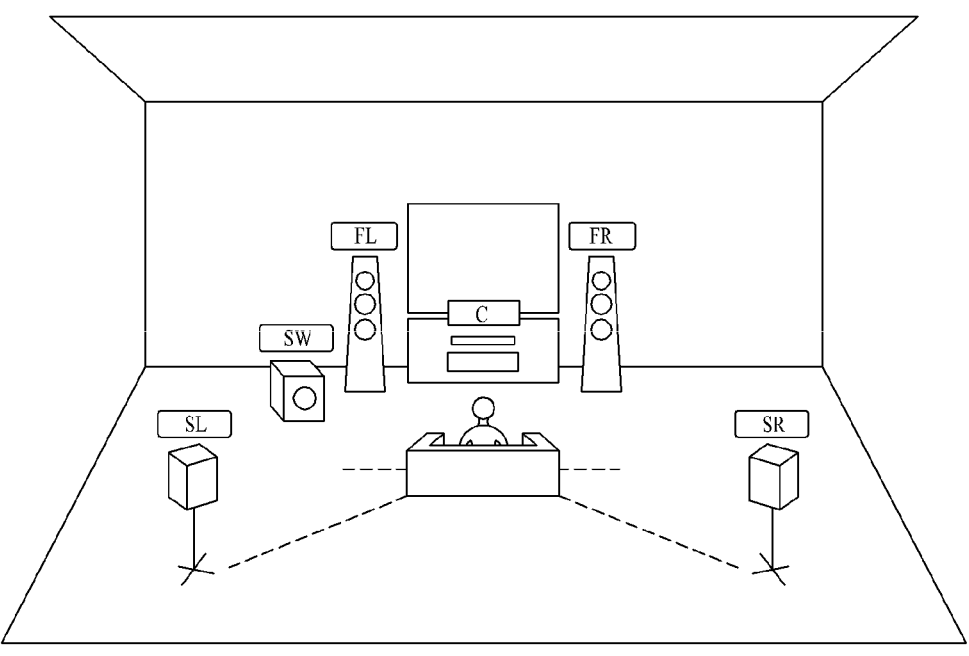
Figures 10A, 10B:
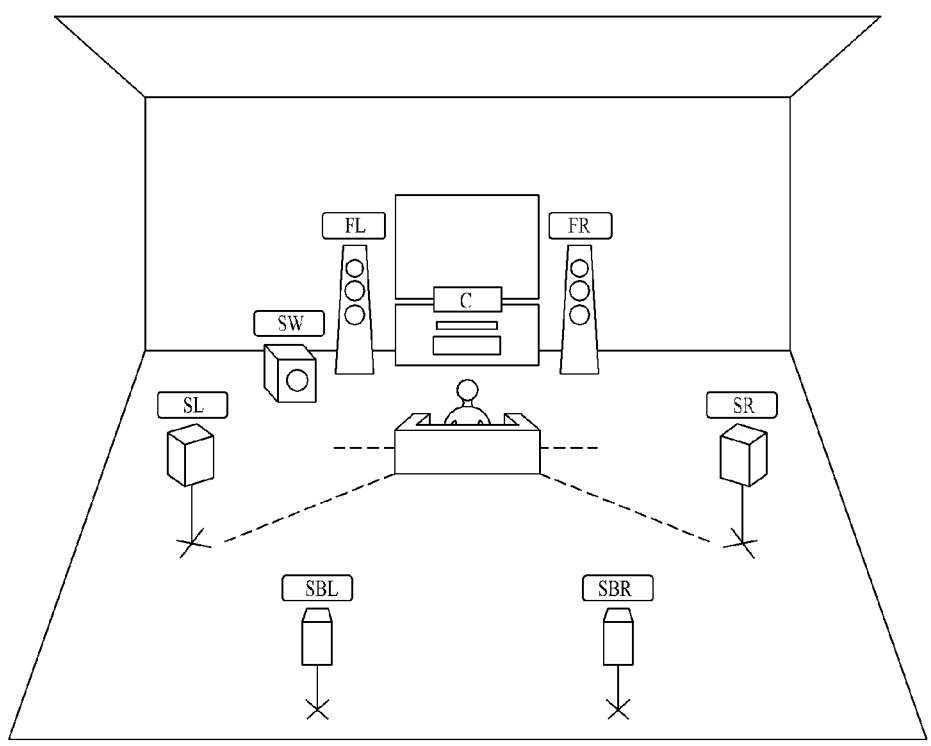

For example, the second conversion module 535 may generate the content in 5.1 structure of FIG. 9A from the content in the PCM input structure of FIG. 7. Through this, the processor 530 may transmit the content in the 5.1 structure (FL, FR, FC, LFE, SL, and SR) of FIG. 9A to a control module of the second electronic apparatus 253. Referring to FIG. 9B, the control module of the second electronic apparatus 253 may play back the content in the 5.1 structure using audio output devices. As another example, the second conversion module 535 may generate the content in 7.1 structure of FIG. 10A from the content in the PCM input structure of FIG. 7. Through this, the processor 530 may transmit the content in the 7.1 structure (FL, FR, FC, LFE, SL, SR, SBL, and SBR) of FIG. 10A to the control module of the second electronic apparatus 253. Therefore, referring to FIG. 10B, the second electronic apparatus 253 may play back the content in the 7.1 structure using audio output devices.

The second encoder 537 may encode the content in the third format. That is, the second encoder 537 may encode plain content. Here, the second encoder 537 may encode the content in the third format received from the electronic device 210 through the communication module 510. Through this, the processor 530 may transmit the content in the third format to the electronic apparatus 150 through the communication module 510. Here, the processor 530 may transmit the content in the third format to the third electronic apparatus 255. Therefore, the third electronic apparatus 255 may play back the content in the third format.

Figure 11:
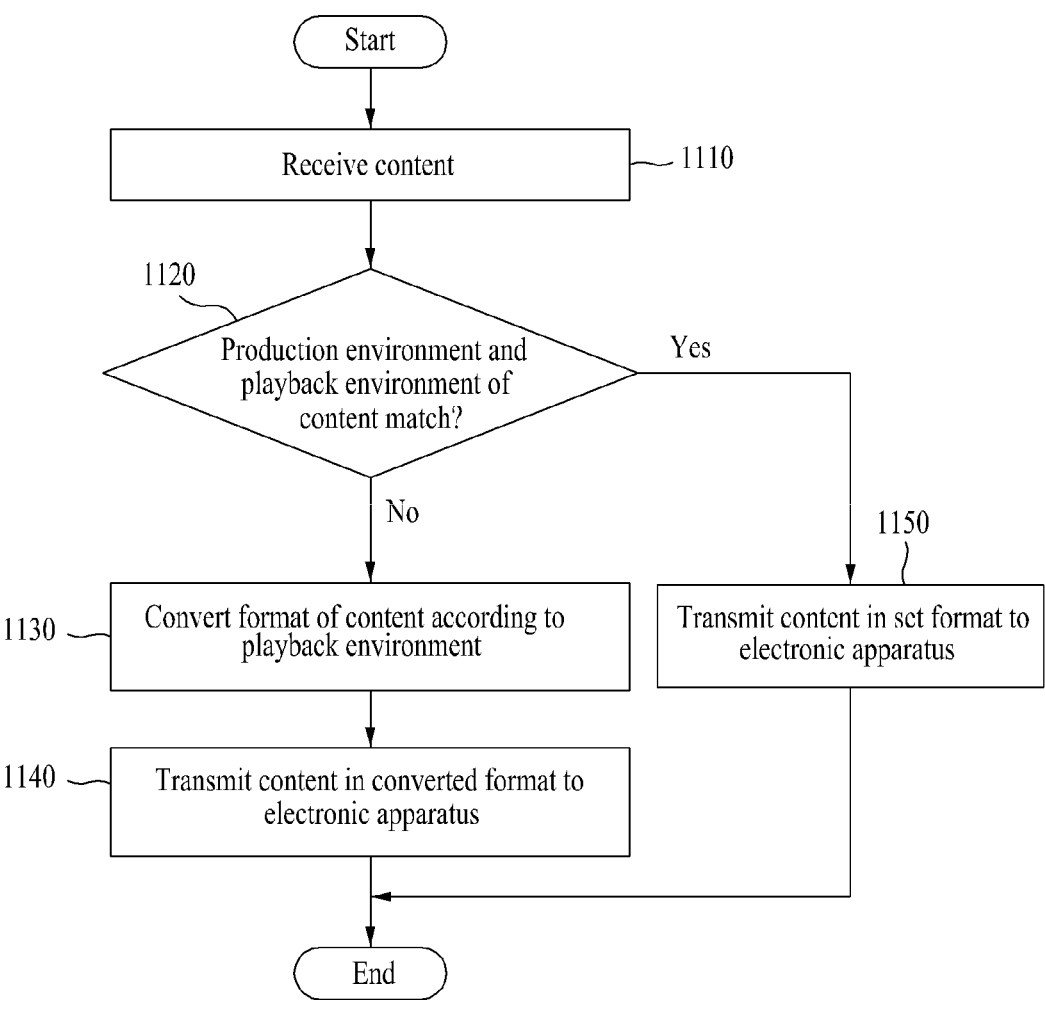
FIG. 11 is a flowchart illustrating an example of an operation procedure of a server according to at least one example embodiment.

FIG. 11 is a flowchart illustrating an example of an operation procedure of the server 230 according to at least one example embodiment.

Referring to FIG. 11, in operation 1110, the server 230 may receive content. The processor 530 may receive the content from the electronic device 210 through the communication module 510. Here, a production environment of the content may be determined according to the type of the electronic device 210. A format of the content may be set according to the production environment of the content. The format of the content may be set to one of a first format, a second format, and a third format. The content in the first format may include metadata according to the first format as immersive content. The content in the second format may include metadata according to the second format as the immersive content. The content in the third format may be plain content.

In operation 1120, the server 230 may determine whether the production environment matches a playback environment for the content. The processor 530 may determine whether the production environment matches the playback environment based on the format of the content since the format of the content is set according to the production environment.

When it is determined that the production environment of the content does not match the playback environment in operation 1120, the server 230 may convert the format of the content according to the playback environment in operation 1130. The processor 530 may convert the type of the content to match the playback environment of the electronic apparatus 150. According to an example embodiment, the first conversion module 531 may convert the content in the second format to the content in the first format to be played back in the first electronic apparatus 251. For example, the first conversion module 531 may convert the content in an ADM format to the content in a GA7 format. Here, the first conversion module 531 may generate the content in the first format by detecting metadata from the content in the second format and by converting the detected metadata to the first format. According to another example embodiment, the second conversion module 535 may convert the content in the first format to the content in the second format to be played back in the second electronic apparatus 253. For example, the second conversion module 535 may convert the content in the GA7 format to the content in a multichannel format. Here, the second conversion module 535 may convert the content in the first format to the content in the second format based on a layout for audio output devices of the playback environment.

In operation 1140, the server 230 may transmit the content in the converted format to the electronic apparatus 150. The processor 530 may transmit the content in the converted format to the electronic apparatus 150 through the communication module 510. According to an example embodiment, the processor 530 may transmit the content in the first format to the first electronic apparatus 251. Here, the first encoder 533 may encode the content in the first format output from the first conversion module 531. For example, the first encoder 533 may encode the content in the GA7 format. The processor 530 may transmit the content in the first format to the first electronic apparatus 251. Therefore, the first electronic apparatus 251 may play back the content in the first format. According to another example embodiment, the processor 530 may transmit the content in the second format to the second electronic apparatus 253. Therefore, the second electronic apparatus 253 may play back the content in the second format. For example, referring to FIG. 9B or 10B, the processor 530 may transmit the content in the multichannel format to the control module of the second electronic apparatus 253. Therefore, the control module of the second electronic apparatus 253 may play back the content in the multichannel format using audio output devices (FL, FR, FC, LFE, SL, and SR; FL, FR, FC, LFE, SL, SR, SBL, and SBR).

Also, when it is determined that the production environment of the content matches the playback environment in operation 1120, the server 230 may transmit the content in the set format to the electronic apparatus 150 in operation 1150. The processor 530 may transmit the content to the electronic apparatus 150 through the communication module 510, while maintaining the format of the content without converting the same. According to an example embodiment, the processor 530 may deliver the content in the first format to the first electronic apparatus 251. Here, the first encoder 533 may encode the content in the first format received through the communication module 510. For example, the first encoder 533 may encode the content in the GA7 format. The processor 530 may transmit the content in the first format to the first electronic apparatus 251. According to another example embodiment, the processor 530 may deliver the content in the second format to the second electronic apparatus 253. Therefore, the second electronic apparatus 253 may play back the content in the second format. According to another example embodiment, the processor 530 may deliver the content in the third format to the third electronic apparatus 255. Here, the second encoder 537 may encode the content in the third format received through the communication module 510. The processor 530 may transmit the content in the third format to the third electronic apparatus 255. Therefore, the third electronic apparatus 255 may play back the content in the third format.

Figure 12:
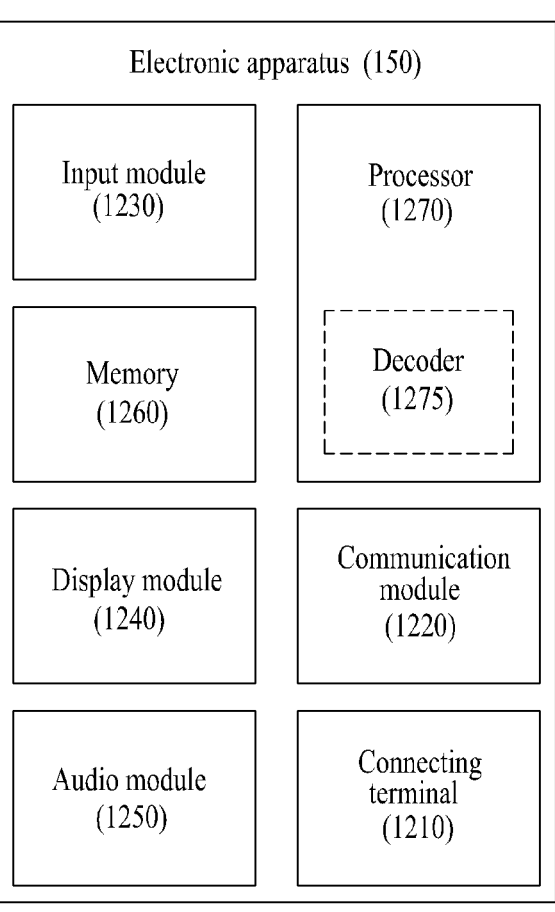
FIG. 12 is a block diagram illustrating an example of an internal configuration of an electronic apparatus according to at least one example embodiment.

FIG. 12 is a diagram illustrating an example of an internal configuration of the electronic apparatus 150 according to at least one example embodiment.

Referring to FIG. 12, the electronic apparatus 150 may include at least one of a connecting terminal 1210, a communication module 1220, an input module 1230, a display module 1240, an audio module 1250, a memory 1260, and a processor 1270. In some example embodiments, at least one of components of the electronic apparatus 150 may be omitted and at least one another component may be added. In some example embodiments, at least two components among the components of the electronic apparatus 150 may be implemented as a single integrated circuitry.

The connecting terminal 1210 may physically connect the electronic device 150 to an external device. For example, the external device may include another electronic apparatus. To this end, the connecting terminal 1210 may include at least one connector. For example, the connector may include at least one of a high definition multimedia interface (HDMI) connector, a universal serial bus (USB) connector, a secure digital (SD) card connector, and an audio connector.

The communication module 1220 may enable the electronic apparatus 150 to communicate with the external device. The communication module 1220 may establish a communication channel between the electronic apparatus 150 and the external device and may communicate with the external device through the communication channel. For example, the external device may include the computer system 110, particularly, the server 230. The communication module 1220 may include at least one of a wired communication module and a wireless communication module. The wired communication module may be connected to the external device in a wired manner through the connecting terminal 1210 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, WiFi direct, and IrDA. The far field communication module may communicate with the external device using a far field communication scheme. Here, the far field communication module may communicate with the external device through a network. For example, the network may include at least one of a cellular network, the Internet, and a computer network such as a local area network (LAN) and a wide area network (WAN).

The input module 1230 may input a signal to be used for at least one component of the electronic apparatus 150. The input module 1230 may include at least one of an input device configured for the user to directly input a signal to the electronic apparatus 150, a sensor device configured to detect an ambient environment and to generate a signal, and a camera module configured to capture an image and to generate image data. For example, the input device may include at least one of a microphone, a mouse, and a keyboard. In some example embodiments, the sensor device may include at least one of a head tracking sensor, a head-mounted display (HMD) controller, a touch circuitry configured to detect a touch, and a sensor circuitry configured to measure strength of force occurring due to the touch.

The display module 1240 may visually display information. For example, the display module 1240 may include at least one of a display, an HMD, a hologram device, and a projector. For example, the display module 1240 may be configured as a touchscreen through assembly to at least one of the sensor circuitry and the touch circuitry of the input module 1230.

The audio module 1250 may auditorily play back information. Here, the audio module 1250 may include at least one audio output device. For example, the audio output device may include at least one of a speaker, a receiver, an earphone, and a headphone.

The memory 1260 may store a variety of data used by at least one component of the electronic apparatus 150. For example, the memory 1260 may include at least one of a volatile memory and a non-volatile memory. Data may include at least one program and input data or output data related thereto. The program may be stored in the memory 1260 as software including at least one instruction and, for example, may include at least one of an operating system (OS), middleware, and an application.

The processor 1270 may control at least one component of the electronic apparatus 150 by executing the program of the memory 1260. Through this, the processor 1270 may perform data processing or operation. Here, the processor 1270 may execute an instruction stored in the memory 1260. The processor 1270 may play back content provided from the server 230. The processor 1270 may play back video content through the display module 1240 or may play back at least one of plain audio content and immersive audio content through the audio module 1250. The processor 1270 may play back the content according to a playback environment of the electronic apparatus 150. Here, the playback environment of the electronic apparatus 150 may be determined according to the type of the electronic apparatus 150.

According to an example embodiment, when the electronic apparatus 150 is the first electronic apparatus 251, the processor 1270 may receive the content in the first format from the server 230 through the communication module 1220 and may play back the content in the first format. Here, the content in the first format may include metadata according to the first format as immersive content. In this case, the processor 1270 may include a decoder 1275. The decoder 1275 may decode the content in the first format. That is, since the content in the first format received from the server 230 is encoded by the first encoder 533 of the server 230, the decoder 1275 may decode the content in the first format. The processor 1270 may render and play back audio signals related to objects based on the metadata. To this end, the processor 1270 may further include a renderer. Through this, the processor 1270 may render the audio signals based on spatial features of the objects in the metadata. Through this, the processor 1270 may realize a user-customized immersive user experience and a user of the first electronic apparatus 251 may feel as if he is there at the source of the audio signals.

For example, a plurality of presets may be stored in the memory 1260. In this case, the processor 1270 may store the metadata in the content in the first format in the memory 1260 as a preset. In response to a selection on one of the presets from the user, the processor 1270 may render and play back the audio signals related to the objects based on the metadata of the selected preset.

According to another example embodiment, when the electronic apparatus 150 is the second electronic apparatus 253, the processor 1270 may receive the content in the second format from the server 230 through the communication module 1220 and may play back the content in the second format. Here, the content in the second format may include metadata according to the first format as the immersive content. In this case, the decoder 1275 may decode the content in the second format, and the processor 1270 may play back the audio signals related to the objects through a plurality of audio output devices based on the metadata. Here, a layout for the audio output devices may be set to the second electronic apparatus 253 and the processor 1270 may play back the audio signals by controlling the audio output devices according to the set layout. Therefore, a user of the second electronic apparatus 253 may feel an immersive experience from a combination of signals output from the respective audio output devices.

According to another example embodiment, when the electronic apparatus 150 is the third electronic apparatus 255, the processor 1270 may receive the content in the third format from the server 230 through the communication module 1220 and may play back the content in the third format. Here, the content in the third format may be plain content. In this case, the processor 1270 may include the decoder 1275. The decoder 1275 may decode the content in the third format. That is, since the content in the third format received from the server 230 is encoded by the second encoder 537 of the server 230, the decoder 1275 may decode the content in the third format. The processor 1270 may play back the plain content through the audio output device.

Figure 13:
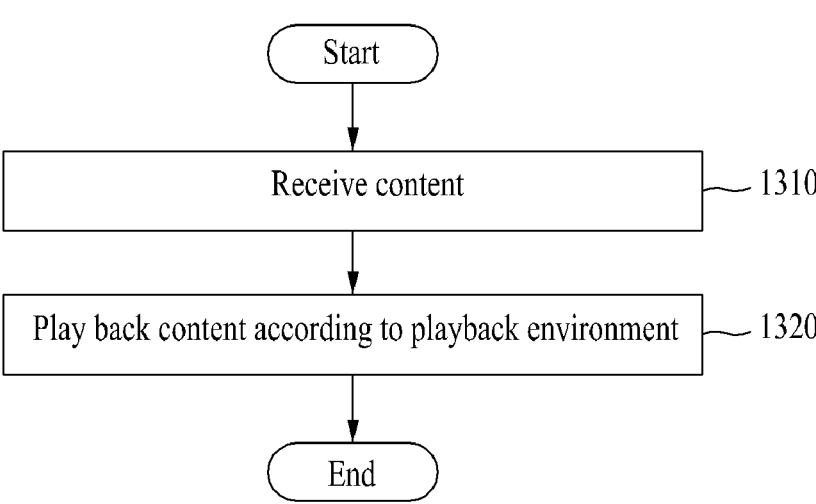
FIG. 13 is a flowchart illustrating an example of an operation procedure of an electronic apparatus according to at least one example embodiment.

FIG. 13 is a flowchart illustrating an example of an operation procedure of the electronic apparatus 150 according to at least one example embodiment.

Referring to FIG. 13, in operation 1310, the electronic apparatus 150 may receive content. The processor 1270 may receive the content from the server 230 through the communication module 1220. Here, content that matches the type of the electronic apparatus 150 or a playback environment of the electronic apparatus 150 may be received. In operation 1320, the electronic apparatus 150 may play back the content according to the playback environment.

According to an example embodiment, when the electronic apparatus 150 is the first electronic apparatus 251, the processor 1270 may play back the content in the first format. Here, the content in the first format may include metadata according to the first format as immersive content. The processor 1270 may render and play back audio signals related to objects based on the metadata. Through this, the processor 1270 may render the audio signals based on spatial features of the objects in the metadata. Through this, the processor 1270 may realize a user-customized immersive user experience and the user of the first electronic apparatus 251 may feel the immersive experience.

For example, a plurality of presets may be stored in the memory 1260. In this case, the processor 1270 may store metadata in the content in the first format in the memory 1260 as a preset. In response to a selection on one of the presets from the user, the processor 1270 may render and play back the audio signals related to the objects based on the metadata of the selected preset.

According to another example embodiment, when the electronic apparatus 150 is the second electronic apparatus 253, the processor 1270 may play back the content in the second format. Here, the content in the second format may include metadata according to the first format as the immersive content. In this case, the processor 1270 may play back the audio signals related to the objects through a plurality of audio output devices based on the metadata. Therefore, a user of the second electronic apparatus 253 may feel a user-customized immersive experience from a combination of signals output from the respective audio output devices.

According to another example embodiment, when the electronic apparatus 150 is the third electronic apparatus 255, the processor 1270 may play back the content in the third format. Here, the content in the third format may be plain content. The processor 1270 may play back the plain content through the audio output device.

According to some example embodiments, the computer system 110 may support content produced in various production environments and various playback environments. That is, the computer system 110 may provide the content to the electronic apparatus 150 in a format that matches a corresponding playback environment. To this end, the computer system 110, particularly, the server 230 may convert a format of content set according to a production environment to match the playback environment. Therefore, the computer system 110 may realize a user-customized immersive user experience in various playback environments with respect to content produced in various production environments. Here, the computer system 110 may process immersive content as well as plain content. That is, the computer system 110 may realize a user-customized immersive user experience according to the immersive content in various playback environments.

A method by the computer system 110 according to at least one example embodiment may include receiving content that includes metadata on spatial features about a plurality of objects (operation 1110), converting a format of the content set according to a playback environment of the content in the electronic apparatus 150 (operation 1130), and transmitting the content in the converted format to the electronic apparatus 150 (operation 1140).

According to at least one example embodiment, the format of the content may be set according to a production environment of the content.

According to at least one example embodiment, the format of the content may include at least one of a first format for rendering and playing back audio signals related to the objects based on the metadata and a second format for playing back audio signals related to the objects through a plurality of audio output devices based on the metadata.

According to an example embodiment, the converting of the format of the content (operation 1130) may include converting the content in the second format to the content in the first format.

For example, the converting to the content in the first format may include detecting the metadata from the content in the second format and converting the metadata to the first format.

According to another example embodiment, the converting of the format of the content (operation 1130) may include converting the content in the first format to the content in the second format.

For example, the converting to the content in the second format may include converting the content in the first format to the content in the second format based on a layout for the audio output devices of the playback environment.

According to at least one example embodiment, the method by the computer system 110 may further include transmitting the content to the electronic apparatus 150 while maintaining the format of the content when the production environment and the playback environment for the content match (operation 1150).

According to at least one example embodiment, the method by the computer system 110 may further include receiving the content completed using a plurality of audio signals and transmitting the received content to the electronic apparatus 150.

The computer system 110 according to at least one example embodiment may include the memory 520, the communication module 510, and the processor 530 configured to connect to each of the memory 520 and the communication module 510 and to execute at least one instruction stored in the memory 520.

According to at least one example embodiment, the processor 530 may be configured to receive content that includes metadata on spatial features about a plurality of objects through the communication module 510, convert a format of the content set according to a playback environment of the content in the electronic apparatus 150, and transmit the content in the converted format to the electronic apparatus 150 through the communication module 510.

According to at least one example embodiment, the format of the content may be set according to a production environment of the content.

According to at least one example embodiment, the format of the content may include at least one of a first format for rendering and playing back audio signals related to the objects based on the metadata and a second format for playing back audio signals related to the objects through a plurality of audio output devices based on the metadata.

According to an example embodiment, the processor 530 may include the first conversion module 531 configured to convert the content in the second format to the content in the first format.

For example, the first conversion module 531 may be configured to detect the metadata from the content in the second format, and convert the metadata to the first format.

According to another example embodiment, the processor 530 may further include the second conversion module 535 configured to convert the content in the first format to the content in the second format.

For example, the second conversion module 535 may be configured to convert the content in the first format to the content in the second format based on a layout for the audio output devices of the playback environment.

According to at least one example embodiment, the processor 530 may be configured to transmit the content to the electronic apparatus 150 through the communication module 510 while maintaining the format of the content when the production environment and the playback environment for the content match.

According to at least one example embodiment, the processor 530 may be configured to receive content completed using a plurality of audio signals through the communication module 510, and transmit the received content to the electronic apparatus 150 through the communication module 510.

The apparatuses described herein may be implemented using hardware components, software components, and/or a combination of the hardware components and the software components. For example, a processing device and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to various example embodiments may be implemented in a form of a program instruction executable through various computer methods and recorded in computer-readable media. Here, the media may be to continuously store a computer-executable program or to temporarily store the same for execution or download. The media may be various types of record methods or storage methods in which single hardware or a plurality of hardware is combined and may be distributed over a network without being limited to a medium that is directly connected to a computer system. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with the terms, for example, "logic," "logic block," "part," "circuit," etc. The module may be an integrally configured part, a minimum unit that performs at least function, or a portion thereof. For example, the module may be configured as an application-specific integrated circuit (ASIC).

According to various example embodiments, each of the components (e.g., module or program) may include a singular object or a plurality of objects. According to various example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to various example embodiments, operations performed by a module, a program, or another component may be performed in a sequential, parallel, iterative, or heuristic manner. Alternatively, at least one of the operations may be performed in different sequence or omitted. Alternatively, at least one another operation may be added.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method, by a computer system, for providing content, comprising:

receiving content that includes metadata on spatial features about a plurality of objects;

determining if a production environment and a playback environment of the content match, wherein if it is determined that the production environment and the playback environment of the content do not match:

converting a format of the content into at least one format among a plurality of formats including a first format, a second format and a third format according to the playback environment of the content in a plurality of electronic apparatuses, wherein one of the first format, the second format and the third format is a multichannel format and at least two of the plurality of electronic apparatuses are different electronic apparatuses;

wherein if it is determined that the production environment and the playback environment of the content do match, then no converting of the format of the content is performed;

transmitting the content in the first format to a first electronic apparatus of the plurality of electronic apparatuses;

transmitting the content in the second format to a second electronic apparatus of the plurality of electronic apparatuses; and transmitting the content in the third format to a third electronic apparatus of the plurality of electronic apparatuses, wherein the first format and the second format are formats for immersive-typed audio content, the first format including a GA7 format and the second format including an audio definition model (ADM) format, and the third format is a format for plain-typed audio content, and wherein the first electronic apparatus and the second electronic apparatus are electronic apparatuses for playing back the immersive audio content, and the third electronic apparatus is an electronic apparatus for playing back the plain-typed audio content.

2. The method of claim 1, wherein the format of the content is set according to a production environment of the content.

3. The method of claim 2, further comprising:

transmitting the content to the electronic apparatus while maintaining the format of the content when the production environment and the playback environment for the content match.

4. The method of claim 1, wherein the format of the content includes at least one of the first format for rendering and playing back audio signals related to the objects based on the metadata, the second format for playing back audio signals related to the objects through a plurality of audio output devices based on the metadata, and wherein the third format is plain audio content.

5. The method of claim 4, wherein the converting of the format of the content comprises converting the content in the second format to the content in the first format.

6. The method of claim 5, wherein the converting to the content in the first format comprises:

detecting the metadata from the content in the second format; and converting the metadata to the first format.

7. The method of claim 4, wherein the converting of the format of the content comprises converting the content in the first format to the content in the second format.

8. The method of claim 7, wherein the first format is converted to the content in the second format based on a layout for the audio output devices of the playback environment.

9. The method of claim 1, further comprising:

receiving content completed using a plurality of audio signals; and transmitting the received content to the electronic apparatus.

10. A non-transitory computer-readable recording medium storing instructions that, when executed by a processor, cause the processor to perform the method of claim 1.

11. A computer system for providing content, comprising:

a memory;

a communication module; and a processor configured to connect to each of the memory and the communication module and to execute at least one instruction stored in the memory, wherein the processor is configured to:

receive content that includes metadata on spatial features about a plurality of objects through the communication module, wherein the content may be in a first format for rendering and playing back audio signals related to objects based on metadata, a second format for rendering and playing back audio signals related to objects through a plurality of output devices based on metadata, and a third format that is plain content;

determine if a production environment and a playback environment of the content match, wherein if it is determined that the production environment and the playback environment of the content do not match, then convert a format of the content into one of the first format, the second format and the third format according to the playback environment of the content in a plurality of electronic apparatuses, wherein one of the first format, the second format and the third format is a multichannel format and at least two of the plurality of electronic apparatuses are different electronic apparatuses, wherein if it is determined that the production environment and the playback environment of the content do match, then do not convert the format of the content, transmit the content in the first format to a first electronic apparatus;

transmit the content in the second format to a second electronic apparatus; and transmit the content in the third format to a third electronic apparatus, wherein the first format and the second format are formats for immersive-typed audio content, the first format including a GA7 format and the second format including an audio definition model (ADM) format, and the third format is a format for plain-typed audio content, and wherein the plurality of electronic apparatuses includes a first electronic apparatus and a second electronic apparatus that are electronic apparatuses for playing back the immersive audio content, and a third electronic apparatus that is an electronic apparatus for playing back the plain-typed audio content.

12. The computer system of claim 11, wherein the format of the content is set according to a production environment of the content.

13. The computer system of claim 12, wherein the processor is configured to transmit the content to the first electronic apparatus, the second electronic apparatus or the third electronic apparatus through the communication module while maintaining the format of the content when the production environment and the playback environment for the content match.

14. The computer system of claim 11, wherein the processor comprises a first conversion module configured to convert the content in the second format to the content in the first format.

15. The computer system of claim 14, wherein the first conversion module is configured to, detect the metadata from the content in the second format, and convert the metadata to the first format.

16. The computer system of claim 11, wherein the processor comprises a second conversion module configured to convert the content in the first format to the content in the second format.

17. The computer system of claim 16, wherein the second conversion module is configured to convert the content in the first format to the content in the second format based on a layout for the audio output devices of the playback environment.

18. The computer system of claim 11, wherein the processor is configured to receive content completed using a plurality of audio signals through the communication module, and transmit the received content to the electronic apparatus through the communication module.

* * * * *